United States Patent [19]

Hashimoto et al.

[11] Patent Number: 4,482,216

[45] Date of Patent: Nov. 13, 1984

[54] SOLID STATE COMPLEMENTARY ELECTROCHROMIC DISPLAY DEVICES

[75] Inventors: Eigo Hashimoto, Sakado; Takanori Nanya, Sayama, both of Japan

[73] Assignee: Citizen Watch Co., Ltd., Tokyo, Japan

[21] Appl. No.: 318,332

[22] Filed: Nov. 5, 1981

[30] Foreign Application Priority Data

Nov. 11, 1980 [JP] Japan ............................. 55-158451
Dec. 5, 1980 [JP] Japan ............................. 55-171014

[51] Int. Cl.³ .............................................. G02F 1/23
[52] U.S. Cl. ................................................... 350/357
[58] Field of Search ........................................ 350/357

[56] References Cited

U.S. PATENT DOCUMENTS 3,840,286 10/1974 Kiss ..................................... 350/357

Primary Examiner—Bruce Y. Arnold
Attorney, Agent, or Firm—Koda and Androlia

[57] ABSTRACT

A solid state complementary electrochromic display device in which a first electrochromic material layer which permits an oxidation-reduction reaction and is colored in a reduction state, an ion permeable insulating layer, a second electrochromic material layer which permits an oxidation-reduction reaction and is colored in an oxidation state are prepared between two electrodes and the first electrochromic material layer and the second electrochromic material layer are colored or bleached simultaneously. The ion permeable insulating layer comprises a halogenide. As a result, high coloration concentration can be obtained at a low potential.

12 Claims, 14 Drawing Figures

SOLID STATE COMPLEMENTARY ELECTROCHROMIC DISPLAY DEVICES

BACKGROUND OF THE INVENTION

1. Field of the Invention

This invention relates to display devices utilizing an electrochemical coloration and bleaching phenomenon, that is, an electrochromic (hereinafter referred to as EC) phenomenon, and more particularly, solid state complementary EC display devices employing a reduction coloration type EC material layer and an oxidation coloration type EC material layer.

2. Description of the Prior Art

The complementary EC display device has a structure in which an EC material layer such as tungsten trioxide ($WO_3$) which is colored in a reduction state with the application of a negative voltage and another EC material layer such as iridium oxide ($Ir(OH)n$) or rhodium oxide ($Rh(OH)n$) which is colored in an oxidation state with the application of a positive voltage are combined in a stack and both EC material layers exhibit coloration or bleaching simultaneously in the same pattern, depending on the application of the external driving voltage. When the display device is viewed, the colored state of both EC material layers can be seen through the stack.

FIG. 1 is a sectional view illustrating a conventional structure of such a solid state complementary EC display device. Referring to FIG. 1, the structure of the conventional solid state complementary EC display device will be discussed: On a transparent substrate 1, a first electrode 2 which is a thin film of a transparent conductive material such as indium-tin oxide (hereinafter referred to as ITO) is formed, and on the surface, a reduction coloration type EC material layer 3 is formed by a process of physical vapor deposition such as evaporation. As the reduction coloration type EC material layer 3, simple substances such as tungsten trioxide ($WO_3$), molybdenum trioxide ($MoO_3$), niobium pentoxide ($Nb_2O_5$) and vanadium pentoxide ($V_2O_5$) or their compounds are used.

Then, on the reduction coloration type EC material layer 3, chromium oxide ($Cr_2O_3$) layer is formed as an ion permeable insulating layer 4 by evaporation and the like, and thereon an oxidation coloration type EC material layer 5 is formed also by evaporation and the like. As the oxidation coloration type EC material layer 5, iridium oxide or rhodium oxide is used.

Finally, on the oxidation coloration type EC material layer 5, a second electrode 6 which is a thin film of a transparent conductive material such as ITO is formed by evaporation and the like, thus making a solid state complementary EC display device.

While the coloration process of the EC display device is given several interpretations, it is generally understood as follows:

The reduction coloration type EC material is colored by the injection of cations into the EC material with the application of an electric field. On the other hand, the oxidation coloration type EC material is colored by the injection of anions. In this case, cations are protons ($H^+$) and anions are hydroxyl ions ($OH^-$), both of which are supplied by the $Cr_2O_3$ layer 4 including $H_2O$.

In the solid state complementary EC display device thus constructed, by applying a negative voltage to the first electrode 2 and a positive voltage to the second electrode 6, the reduction coloration type EC material layer 3 and the oxidation coloration type EC material layer 5 can be colored at the same time, and by reversing the applied voltages, they can be bleached at the same time. However, conventional solid state complementary display devices have not been put into practical use because of the following defects: Since the absolute amount of $H_2O$ contained in the chromium oxide ($Cr_2O_3$) layer used as the ion permeable layer is limited and supplying of cations and anions to the EC material layers is insufficient, the coloration concentration useful for the display device cannot be obtained on a low driving voltage. In order to obtain the useful coloration concentration, it is necessary to increase the driving voltage, which causes not only the reversibility of coloration and bleaching of the EC materials to be impaired but the device life to be shortened. Moreover, the use of chromium oxide ($Cr_2O_3$) as the ion permeable insulating layer causes an electric current which does not directly contribute to the coloration to flow when a driving voltage is applied across the first and the second electrodes, thus tending to increase power consumption.

SUMMARY OF THE INVENTION

It is an object of the invention to provide a solid state complementary EC display device which is free of the aforementioned conventional defects and has a coloration concentration enough for practical application on a low driving voltage, and which permits a long-term stable display.

It is a further object of the invention to provide a solid state complementary EC display device having a structure improved in moisture resistance.

It is another object of the invention to provide a practical solid state complementary EC display device having EC material layers formed in a display pattern.

To attain the above objects, this invention is characterized by a solid state complementary EC display device comprising:

a substrate made of an optically transparent material;

a first electrode which is in contact with the substrate and made of an optically transparent material;

a first solid state EC material layer which is in contact with the first electrode, permits an oxidation-reduction reaction and is colored in one state of the oxidation and the reduction;

a solid state ion permeable insulating layer which is in contact with the first EC material layer and made of halogenide;

a second solid state EC material layer which is in contact with the ion permeable insulating layer, permits the oxidation-reduction reaction, and is colored in the other state of the oxidation and the reduction, when colored, the second solid state EC material layer having a state opposite to a reaction state in which the first EC material layer is colored; and a second electrode which is in contact with the second EC material layer, whereby the first and the second EC material layers are colored or bleached simultaneously when a voltage is applied across the first and the second electrodes.

Further objects, features and advantages of the present invention will become apparent from the following description of the preferred embodiments thereof, taken in conjunction with the accompanying drawings.

DETAILED DESCRIPTION OF THE PREFERRED EMBODIMENTS

Figure 1:
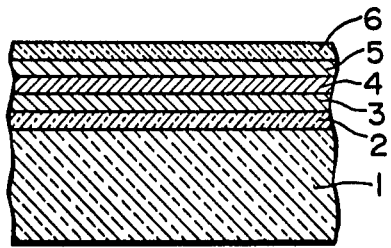
FIG. 1 is a partially sectional view of the structure of a conventional solid state complementary EC display device.
Figure 2A:
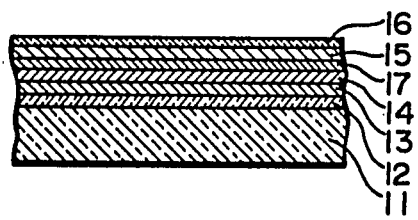
FIGS. 2a and 2b are partially sectional views of a solid state complementary EC display device according to an embodiment of the invention.
Figure 2B:
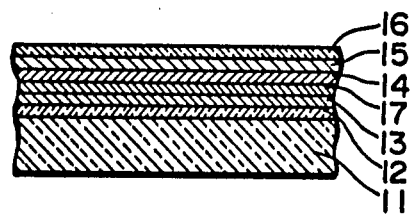

FIGS. 2a and 2b show a first embodiment of a solid state complementary EC display device according to the invention. In FIG. 2, a first electrode 12 formed of a thin ITO film of an optically transparent conductive material is deposited by evaporation on a first substrate 11 formed of soda-lime glass which is a transparent material. The sheet resistance of the transparent conductive film thus produced is about 10 ohm/square. Next, after tungsten trioxide ($WO_3$) of the reduction coloration type is sheeted to a thickness of 5000 Å as a first EC material layer 13 on the first electrode 12 using the physical vapor deposition (PVD) method such as evaporation, a layer of lithium iodide (LiI) which is one of the halogenides is formed to a thickness of about 8000 Å as an ion permeable insulating layer 14. Further, on the surface, a silicon monoxide (SiO) film is serially deposited to a thickness of about 500 Å as an electron conduction blocking layer 17 also by the PVD method. Then, iridium oxide (Ir(OH)n) of the oxidation coloration type EC is deposited to a thickness of about 3000 Å as a second EC material layer 15 on the silicon monoxide 17 by ion plating in an atmosphere including oxygen and water vapor. Finally, in the same manner as in the first electrode 12, a seocnd electrode 16 formed of ITO is deposited on a second EC material layer 15 by ion plating in an atmosphere including oxygen and water vapor, thereby constructing a solid state complementary EC display device according to the invention.

In the first embodiment, the oxidation coloration type EC material layer can also be used as the first EC material layer 13. In this case, as the second EC material 15, the reduction coloration type EC material is used. Further, as shown in FIG. 2b, it is possible that the silicon monoxide layer 17 is formed on the first EC material layer 13, the ion permeable insulating layer 14 is formed on the silicon monoxide layer 17 and that the second EC material layer 15 is formed thereon.

The ion permeable insulating layer 14 permits ions to permeate but does not electrons. The layer of halogenide such as lithium iodide used as the ion permeable insulating layer 14 assures the oxidation-reduction reaction of EC materials, thus improving the coloration efficiency. Also, the silicon monoxide (SiO) layer prepared in contact with the ion permeable layer acts as an electron conduction blocking layer, further enhancing the coloration efficiency. Moreover, the use of the silicon monoxide electron conduction blocking layer permits the halogenide layer to be thinned.

When operating the solid state complementary EC display device according to the invention, upon the application of a negative voltage to the first electrode 12 and a positive voltage to the second electrode 16, tungsten trioxide ($WO_3$) which is the first electrochromic material layer 13 of the reduction coloration type is reduced and iridium oxide (Ir(OH)n) which is the second EC material layer 15 of the oxidation coloration type is oxidized. As a result, the first and the second EC material layers are colored at the same time. Therefore, the colored state of the first and second EC material layers can be seen through the stack and have the excellent color effect of deep color. Similarly, bleaching is effected by applying a positive voltage to the first electrode 12 and a negative voltage to the second electrode 16.

Figure 3A:
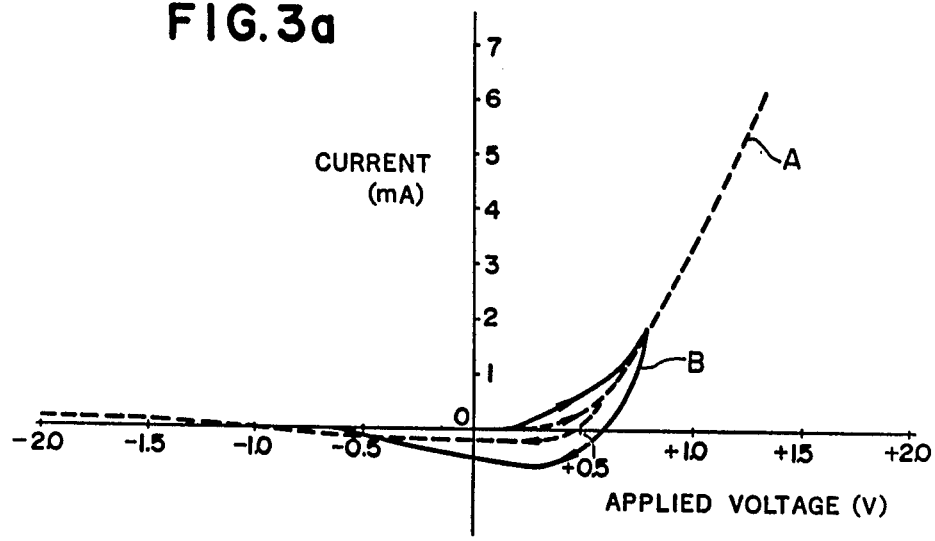
FIGS. 3a and 3b are graphical representations of voltage versus current characteristics and voltage versus optical absorption characteristics of the conventional solid state complementary EC display device and the present solid state complementary EC display device.
Figure 3B:
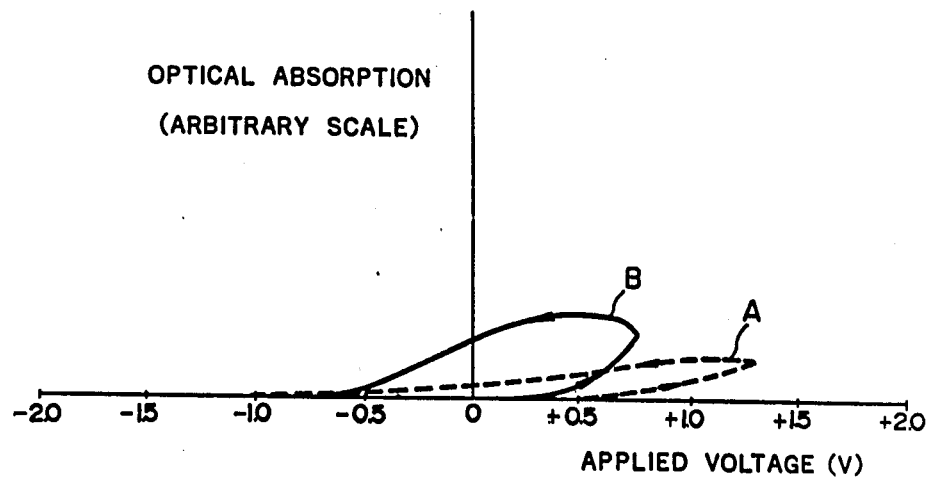

FIGS. 3a and 3b show the comparison of the characteristics of current vs. voltage and optical absorption vs. voltage between the conventional solid state complementary EC display device using chromium oxide ($Cr_2O_3$) as the ion permeable insulating layer and the solid state complementary EC display device using lithium iodide (LiI) as the same of the invention.

In FIGS. 3a and 3b, dashed line A represents the characteristics of the conventional solid state complementary EC display device, while solid line B represents the characteristics of the solid state complementary EC display device of this invention. In measuring those characteristics, $\pm 2$ V at a sweep speed of 200 mV/sec was applied to the conventional embodiment, while $\pm 1$ V was applied to the present embodiment. On the other hand, optical absorption was obtained by feeding a ray of light from a light source of a 633 nm He—Ne laser into each display device and measuring the light passing through the display device as photoelectric voltage by means of a silicon photodiode in response to the variation in light transmission strength. This means that the higher the optical absorption factor, the higher the coloration concentration, which is suitable for display devices.

When the present and the conventional embodiments are compared from the characteristics shown in FIGS. 3a and 3b, it is proved that the conventional embodiment has a lower optical absorption factor, i.e. coloration concentration, a higher current leakage which does not contribute to coloration and has very poor coloration efficiency. On the other hand, the present embodiment is proved that the optical absorption factor, i.e. coloration concentration is about twice that of the conventional example at a low applied voltage of 1 V or less which is below the decomposition voltage of $H_2O$, the current value is lower and that coloration efficiency is higher, thus reaching the field of practical use. Also, the display device of the present embodiment is higher in memory effect depending on hysteresis in comparison with the conventional emgodiment. Therefore, the present embodiment has overcome the defects of the conventional solid state complementary EC display device and provides the optical concentration variation in the field of practical use at less power consumption with good reversibility. Further, since the applied voltage is below the decomposition voltage of $H_2O$, no gas is produced. Then, a display with long-term stability can be obtained.

Figure 4A:
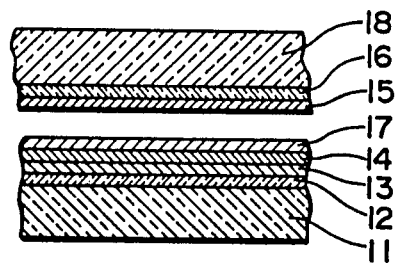
FIGS. 4a, 4b, 4c and 4d are partially sectional views of solid state EC display devices according to other embodiments of the invention.
Figure 4C:
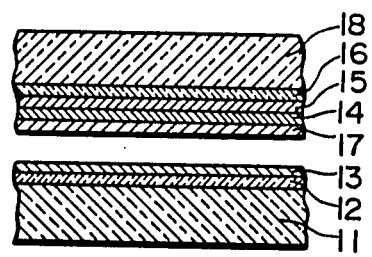
Figure 4B:
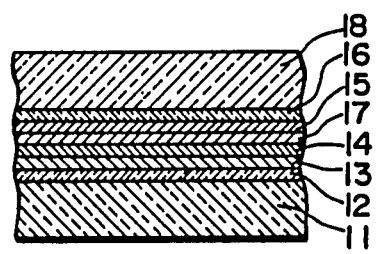

FIGS. 4a, 4b, 4c and 4d show a second embodiment according to the present invention. Referring to FIG. 4a, the method of manufacturing the solid state complementary EC display device of the second embodiment will be explained. First of all, on a first substrate 11, a first electrode 12, a first EC material layer 13, an ion permeable insulating layer 14 and an electron conduction blocking layer 17 are serially formed in the same method as in the first embodiment. Next, a second transparent substrate 18 formed of soda-lime glass as in the first substrate is prepared and thereon a second electrode 16 formed of an ITO thin film is deposited by evaporation. On the surface, a second EC material layer 15 formed of iridium oxide (Ir(OH)n) of the oxidation coloration type is formed to a thickness of about 3000 Å by ion plating in an atmosphere including oxygen and water vapor. Then, the first substrate and the second substrate are positioned opposite and pressed at a pressure of 1 kg/cm$^2$, thereby making a display device. In FIG. 4b, there is shown a sectional view of the pressed state of the display device.

According to the second embodiment, the display effect is analogous to that of the first embodiment. However, the second embodiment has additional effects compared with the first embodiment in which the elements of the EC display device are serially deposited on the single substrate: In the first embodiment, when the ITO film of the second electrode is formed, it is necessary to prepare it at room temperature at which the substrate is kept, from the viewpoint of stability in temperature of the elements such as the Ir(OH)n layer which is previously deposited as the second EC material layer and adversely affected by high temperature. The ITO film with sufficient properties could not be formed in the conventional evaporation method.

Therefore, the method of ion plating must be used for forming the film. As in the second embodiment, on the contrary, since the second substrate is separately prepared and the ITO film of the second electrode is formed on that substrate, it is not necessary to consider the temperature effect on the other elements. As a result, the ITO film with sufficient properties can be obtained by the conventional evaporation. Moreover, the use of the second substrate allows the display device to be protected mechanically and chemically from the external environment.

Figure 4D:
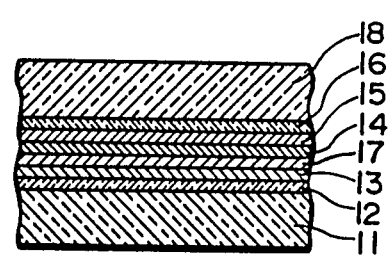

In this example, the halogenide LiI layer which serves as the ion permeable insulating layer 14 and the oxidation SiO layer which serves as the electron conduction blocking layer 17 have been deposited on the $WO_3$ layer of the first substrate 13 which is the first EC material. If these layers are deposited on Ir(OH)n which is the second EC material layer 15, it would cause no inconvenience. That is to say, when the LiI layer and SiO layer are serially deposited on the second substrate and are pressed to construct a display device, display effects similar to those shown in FIGS. 4a and 4b can be obtained. FIGS. 4c and 4d are sectional views of the display device in this case showing both states before and after the two substrates are pressed.

In the first and second embodiments according to the present invention, the tungsten trioxide ($WO_3$) is used as the first EC material layer 13. In addition, simple substances such as molybdenum trioxide ($MoO_3$), niobium pentoxide ($Nb_2O_5$), vanadium pentoxide ($V_2O_5$) and the like or their compounds can be used. On the other hand, as the second EC material layer 15, besides the iridium oxide (Ir(OH)n), rhodium oxide (Rh(OH)n), nickel oxide (NiO) and the like can be used. Moreover, the first and the second embodiments of the present invention use LiI which is one of the halogenides as the ion permeable insulating layer. As halogenides, besides the LiI, alkali halide represented by lithium fluoride (LiF), sodium fluoride (NaF), potassium fluoride (KF), lithium chloride (LiCl), sodium chloride (NaCl), potassium chloride (KCl), lithium bromide (LiBr), sodium bromide (NaBr), sodium iodide (NaI) and potassium iodide (KI), or halogenide represented by magnesium fluoride ($MgF_2$), calcium fluoride ($CaF_2$), lead fluoride ($PbF_2$), tin fluoride ($SnF_2$), magnesium chloride ($MgCl_2$), calcium chloride ($CaCl_2$), lead chloride ($PbCl_2$), tin chloride ($SnCl_2$), magnesium bromide ($MgBr_2$), calcium bromide ($CaBr_2$), lead bromide ($PbBr_2$), tin bromide ($SnBr_2$), magnesium iodide ($MgI_2$), calcium iodide ($CaI_2$), lead iodide ($PbI_2$) and tin iodide ($SnI_2$).

Moreover, as the electron conduction blocking layer 17, besides the aforementioned SiO, tantalum pentoxide ($Ta_2O_5$), zirconium oxide ($ZrO_2$), titanium oxide ($TiO_2$), aluminium oxide ($Al_2O_3$), hafnium oxide ($HfO_3$) and the like can be used.

If the aforementioned materials are used as the first EC material layer, the second EC material layer, the ion permeable insulating layer, and the electron conduction blocking layer, respectively, the display effects similar to those of the first and the second embodiments can be obtained.

Figure 5:
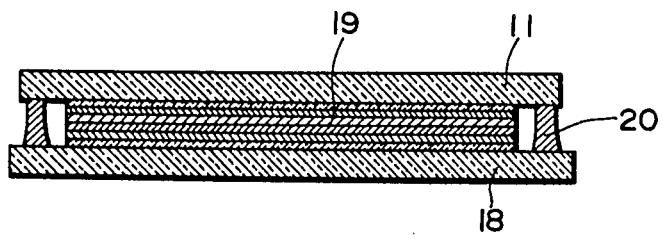
FIG. 5 is a section view of a solid state EC display device whose periphery is sealed according to the invention.

FIG. 5 shows the structure of a further display device in which the display device of the second embodiment according to the invention shown in FIGS. 4a to 4d is sealed at the periphery thereof to improve the moisture-proof characteristic. In FIG. 5, reference numeral 11 denotes a first substrate, 18 is a second substrate and 19 is a group of EC element layers. After the first substrate 11 and the second substrate 18 are mechanically pressed, all the circumference of the joint ends is sealed by means of an organic sealing member. Reference 20 represents the sealed part. As the sealing member, not only the organic sealing member but an inorganic sealing member such as solder is available. As the ion permeable insulating layer 14, this embodiment uses deliquescent LiI. However, as shown in FIG. 5, by sealing the periphery of the display device, the device is protected from the external environment and the LiI is prevented from deliquescing. Therefore, the solid state complementary EC display device thus seal-protected can operate with long-term stability so as to be useful for practical applications.

The respective embodiments described above show the basic structure of the solid state complementary EC display devices of the invention. In order to assure digital displays for timepieces, however, there are still problems in seven segment electrode array, layer structure or the like. Conventionally, no specific structure to solve these problems has been suggested. This invention provides a specific display structure for driving the seven segments of the solid state complementary EC display device in the following further embodiments in order to allow the applications to digital timepiece displays.

Figure 6:
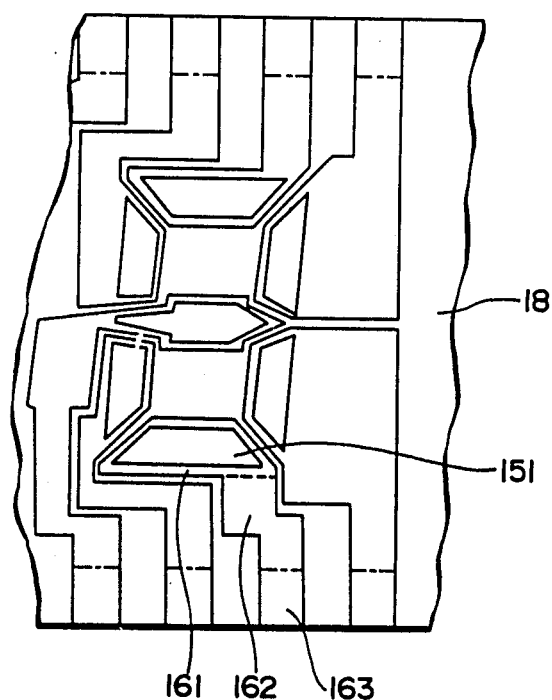
FIG. 6 is a plan view of a pattern of segments and segmented electrodes of a solid state EC display device having a seven segment display according to the invention.

FIG. 6 is a front fiew illustrating an embodiment of the electrode array for driving seven segments. An ITO film deposited on a second substrate 18 forms each segment drive electrode comprising a segment locating position 161, a lead position 162 and a connector position 163. On the segment locating position 161, a segment position 151 comprising a display EC material layer in a size smaller than the locating position 161 is patterned. The term "segment locating position" as employed herein means as shown in FIG. 6 an area surrounded with a full line enclosing the segment position 151 and a dashed line defining the lead position 162, and the segment locating positions for the other six segments should be understood in the same way. In the embodiments mentioned below, the term "segment locating position" should be interpreted in the same way as shown in FIG. 6. In FIG. 6, the connector position 163 is defined as a small-sized area shown by a dotted and dashed line to connect electrically the display device to the external mounting section of a timepiece.

Figure 7:
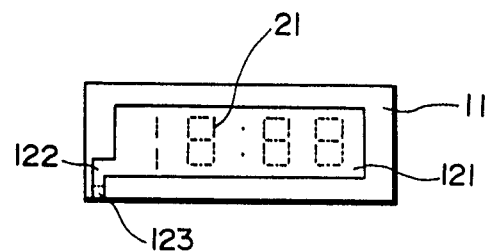
FIG. 7 is a plan view of a pattern of a common electrode of the solid state complementary EC display device having a seven segment display according to the invention.

A common electrode is formed on a counter substrate. This electrode is also made of the ITO and the pattern is illustrated in the front view of FIG. 7. Numeral 11 represents a first substrate. The common electrode 121 is formed so as to enclose all segment positions 151 on the second substrate 18 and is electrically connected to the external mounting section of the timepiece through a lead position 122 and a connector position 123. After making the cell by pressing both substrates, by applying a voltage in response to a drive signal across the common electrode and the segmented electrodes, each of segment positions is colored or bleached. Thus, the seven segments are driven.

Figure 8:
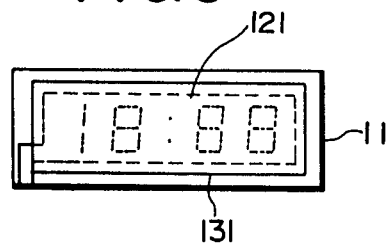
FIG. 8 is a plan view of a pattern of a reduction coloration type EC material layer formed on the common electrode shown in FIG. 7.

In such a seven segment drive EC cell, however, short circuits of the common electrode and the segmented electrodes and leakage of current which may occur at any place other than the segment positions must be avoided. To this end, all the overlapped positions between the common electrode and the segmented electrodes except the segment positions must be insulated in some method. According to the invention, the insulation is effected by using the $WO_3$ layer of the first EC layer also as an insulating film. FIG. 8 shows a pattern of the $WO_3$ layer 131. Numeral 11 is a first substrate. The pattern 131 of the $WO_3$ layer is formed so as to enclose a common electrode pattern 121. The $WO_3$ layer has in its bleached state an electric resistance of the order of several megohms or more enough to fulfil the function as an insulating layer at any place other than the segment positions.

As shown in FIG. 8, therefore, if the pattern of the $WO_3$ layer formed larger than the common electrode part, all the overlapped portions except the segment positions can be insulated between the common electrode and the segmented electrodes.

Figure 9:
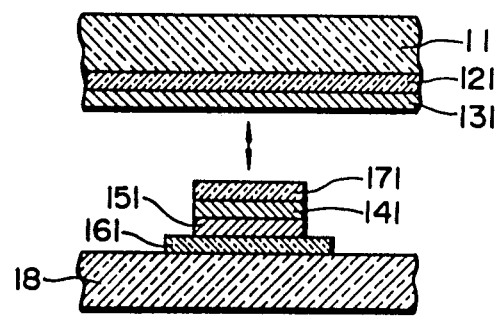
FIG. 9 is a partially sectional view showing a size relation of the layers of the solid state complementary EC display device according to the invention.

Referring now to a further sectional view, the specific display structure will be discussed: In FIG. 9, an ITO film is deposited by evaporation on a first substrate 11 and a pattern is etched as shown by reference numeral 121 of FIG. 7 by a process of photo-etching, thus making a common electrode 121 (first electrode). Further, on its surface, a $WO_3$ layer 131 (first EC material layer) is evaporated to a thickness of 5000 Å through a mask so as to form the pattern illustrated at 131 of FIG. 8.

Next, on a second substrate 18, an ITO film is formed by evaporation and the pattern in which segment locating positions 161, lead positions 162 and connector positions 163 in FIG. 6 are connected is etched by photo-etching, thereby making segmented electrodes 161 (second electrode). On the segmented electrodes 161, an $Ir(OH)_n$ layer 151 (second EC material layer) of 3000 Å in thickness is formed in the pattern as indicated by numeral 151 of FIG. 6 by the IP process including oxygen and water vapor. In this process, the $Ir(OH)_n$ layer 151 is patterned through a mask.

The fact that the $Ir(OH)_n$ layer 151 is patterned in the same size as the segment positions 35 as shown in FIG. 6 means that the display portion of the seven segment drive solid state complementary display device is determined by the $Ir(OH)_n$ layer. The reasons that the $Ir(OH)_n$ layer is formed in the same size as the segment positions are: Unlike the $WO_3$ layer, the $Ir(OH)_n$ layer cannot be used as an insulating layer because of its low electric resistance in the bleached state, and the $Ir(OH)_n$ layer is not colored sufficiently, if the pattern is formed larger in size.

On the $Ir(OH)_n$ layer 151, using the same mask, the LiI layer 141 of 8000 Å in thickness and the SiO layer 171 of 500 Å in thickness are evaporated successively without impairing vacuum. The LiI layer 141 and the SiO layer 171 need depositing only on the display portion. Therefore, it would be satisfactory if the same pattern as the $Ir(OH)_n$ layer 151, i.e. the pattern of segment position 151 in FIG. 6 is formed.

The first substrate and the second substrate in which the EC elements are deposited in the above manner are placed so that the deposited surfaces may face each other and they are pressed at a pressure of 1 kg/cm². All the circumference of the contact ends is sealed by means of an organic sealing member. The solid state complementary EC display device thus constructed can accomplish seven segment drive with long-term stability.

As described above, according to the invention, by using halogenide as the ion permeable insulating layer in the solid state complementary EC display device constructed so that the reduction coloration type EC material layer and the oxidation coloration type EC material layer are colored simultaneously and that the coloration can be seen through the stack, the coloration concentration high enough for practical applications can be obtained on a low voltage drive and a display with long-term stability is assured. Moreover, by preparing the electron conduction blocking layer in contact with the ion permeable insulating layer, the above effects can be enhanced.

In addition, as EC material layers are formed in a display pattern and the display device is so sealed to improve moisture resistance, the device can be provided with higher stability and longer life.

It is further understood by those skilled in the art that the foregoing description is preferred embodiments of the disclosed display device and that various changes and modifications may be made in the invention without departing from the sprit and scope thereof.

What is claimed is:

1. A solid state complimentary electrochromic display device comprising:
   a substrate made of an optically transparent material;

a first electrode which is contact with said substrate and made of an optically transparent material;

a fist solid state electrochromic material which is in contact with said first electrode, permits an oxidation-reduction reaction, and is one of a reduction coloration type electrochromic material and an oxidation coloration type electrochromic material;

a solid state ion permeable insulating layer which is in contact with said first electrochromic material layer and is made of halogenide;

a second solid state electrochromic material layer which is in contact with said ion permeable insulating layer, permits the oxidation-reduction reaction, and is the other of a reduction coloration type electrochromic material and an oxidation coloration type electrochromic material; and a second electrode which is in contact with said second electrochromic material layer;

whereby on applying a voltage in which the electrode in contact with the reduction coloration type electrochromic material layer is negative and the electrode in contact with the oxidation coloration type electrochromic material layer is positive, the first and second solid state electrochromic material layers are simultaneously colored, and on applying a voltage in which the electrode in contact with the reduction coloration type electrochromic material layer is positive and the electrode in contact with the oxidation coloration type electrochromic material layer is negative, the first and second solid state electrochromic material layers are simultaneously bleached.

2. The solid state complementary electrochromic display device according to claim 1 further comprising an electron conduction blocking layer interposed between said solid state ion permeable insulating layer and one of said first and second solid state electrochromic material layers.

3. The solid state complementary electrochromic display device according to claim 2 further comprising a second substrate which is in contact with said second electrode.

4. The solid state complementary electrochromic display device according to claim 1, 2 or 3, wherein said first solid state electrochromic material layer is tungsten trioxide and said second electrochromic material layer is one material selected from the group consisting of iridium oxide, rhodium oxide and nickel oxide.

5. The solid state complementary electrochromic display device according to claim 1, 2 or 3 wherein said halogenide is alkali halide.

6. The solid state complementary electrochromic display device according to claim 5 wherein said alkali halide is lithium iodide.

7. The solid state complementary electrochromic display device according to claim 2 or 3 wherein said electron conduction blocking layer is silicon monoxide.

8. The solid state complementary electrochromic display device according to claim 3 wherein the outside surface between said first substrate and said second substrate is sealed around the periphery thereof.

9. The solid state complementary electrochromic display device according to claim 1, 2, 3 or 8 wherein at least one of said first and the second solid state electrochromic material layers is formed in a display pattern.

10. The solid state complementary electrochromic display device according to claim 9 wherein at least one of said first and second solid state electrochromic material layers is formed in a display pattern and said material layer comprises iridium oxide.

11. The solid state complementary electrochromic display device according to claim 9 wherein said pattern is segmented.

12. The solid state complementary electrochromic display device according to claim 10 wherein one electrode of said first and second electrodes in contact with one of said first and second electrochromic material layers having said pattern is a segmented electrode and the other electrode is a common electrode, wherein a locating position of said segmented electrode is larger than said pattern, and wherein said common electrode is formed to cover said segmented electrode.

* * * * *